(12) United States Patent
Semin et al.

(10) Patent No.: US 9,239,739 B2
(45) Date of Patent: Jan. 19, 2016

(54) METHODS AND APPARATUS FOR CONTROLLING AFFINITY FOR EXECUTION ENTITIES

(71) Applicant: Intel Corporation, Santa Clara, CA (US)

(72) Inventors: Andrey Semin, Munich (DE); Alexander Supalov, Tuntenhausen (DE)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 14/040,200

(22) Filed: Sep. 27, 2013

(65) Prior Publication Data

US 2015/0095912 A1    Apr. 2, 2015

(51) Int. Cl.
    *G06F 9/48*      (2006.01)
    *G06F 9/50*      (2006.01)

(52) U.S. Cl.
    CPC .............. *G06F 9/5033* (2013.01); *G06F 9/48* (2013.01)

(58) Field of Classification Search
None
See application file for complete search history.

(56) References Cited

U.S. PATENT DOCUMENTS

| | | | | |
|---|---|---|---|---|
| 6,289,369 B1 * | 9/2001 | Sundaresan | ................... | 718/103 |
| 8,336,056 B1 * | 12/2012 | Gadir | ........................... | 718/104 |
| 2011/0087814 A1 * | 4/2011 | Liu et al. | ....................... | 710/260 |

OTHER PUBLICATIONS

"Inf: Understanding How to Set the SQL Server I/O Affinity Option", Aug. 15, 2013, available at http://support.microsoft.com/kb/298402, 2 pages.
"numactl(8)—Linux man page", Sep. 5, 2013, available at http://linux.die.net/man/8/numactl, 2 pages.
"Processor affinity", Aug. 15, 2013, available at http://en.wikipedia.org/wiki/Processor_affinity, 4 pages.
"Intel® MPI Library for Linux* OS", Reference Manual, Copyright © 2003-2013 Intel Corporation; Document No. 315399-011, pp. 199.
Semin, et al. "Methods, Systems and Apparatuses for Processor Selection in Multi-Processor Systems", U.S. Appl. No. 13/728,367, filed Dec. 27, 2012, 39 pages.

* cited by examiner

*Primary Examiner* — Emerson Puente
*Assistant Examiner* — Jonathan R Labud
(74) *Attorney, Agent, or Firm* — Barre Law Firm, PLLC

(57) ABSTRACT

In a data processing system that is executing a parent execution entity of an application, the parent execution entity has a first affinity setting. The data processing system enables the parent execution entity to create a worker execution entity that has a second affinity setting without changing the affinity setting of the parent execution entity. Workload for the application may then be performed in parallel by the parent execution entity and the worker execution entity. In one embodiment, to create the worker execution entity with the second affinity setting, the system first creates a delegate execution entity that has the first affinity setting. The system then changes the affinity setting of the delegate execution entity to the second affinity setting. The delegate execution entity then creates the worker execution entity with the second affinity setting. Another embodiment involves a super-delegate execution entity. Other embodiments are described and claimed.

22 Claims, 5 Drawing Sheets

METHODS AND APPARATUS FOR CONTROLLING AFFINITY FOR EXECUTION ENTITIES

TECHNICAL FIELD

Embodiments described herein generally relate to data processing and in particular to methods and apparatus for controlling affinity for execution entities.

BACKGROUND

A data processing device may include one or more processing cores, and those cores may be used to support multithreading and/or multiprocessing. In recent years, processors with many cores have entered mainstream deployment. Terms like many-core and manycore have been coined to denote processors with a dozen or more cores, such as the processors distributed by Intel Corporation under the INTEL XEON PHI trademark, for instance.

The capabilities provided by processors with many cores can increase the importance of multithreading and multiprocessing. In particular, it can be important for software to be able to effectively and efficiently control processor affinity settings for execution entities like threads and processes. It can also be important for software to be able to effectively and efficiently control affinity settings for other resources, such as memory and input/output (I/O) resources. The affinity settings may also be referred to as the affinity mask.

In a conventional processing device, when the currently executing thread of an application (the parent thread) creates or instantiates a new thread (a child thread), the child thread automatically inherits the processor, memory, and I/O affinity settings of the parent thread. However, this behavior can create challenges, particularly when (a) different affinity settings would be more appropriate for the child thread and (b) the original affinity settings of the parent thread should be preserved during and after instantiation of the child thread.

DESCRIPTION OF EMBODIMENTS

Figure 1:
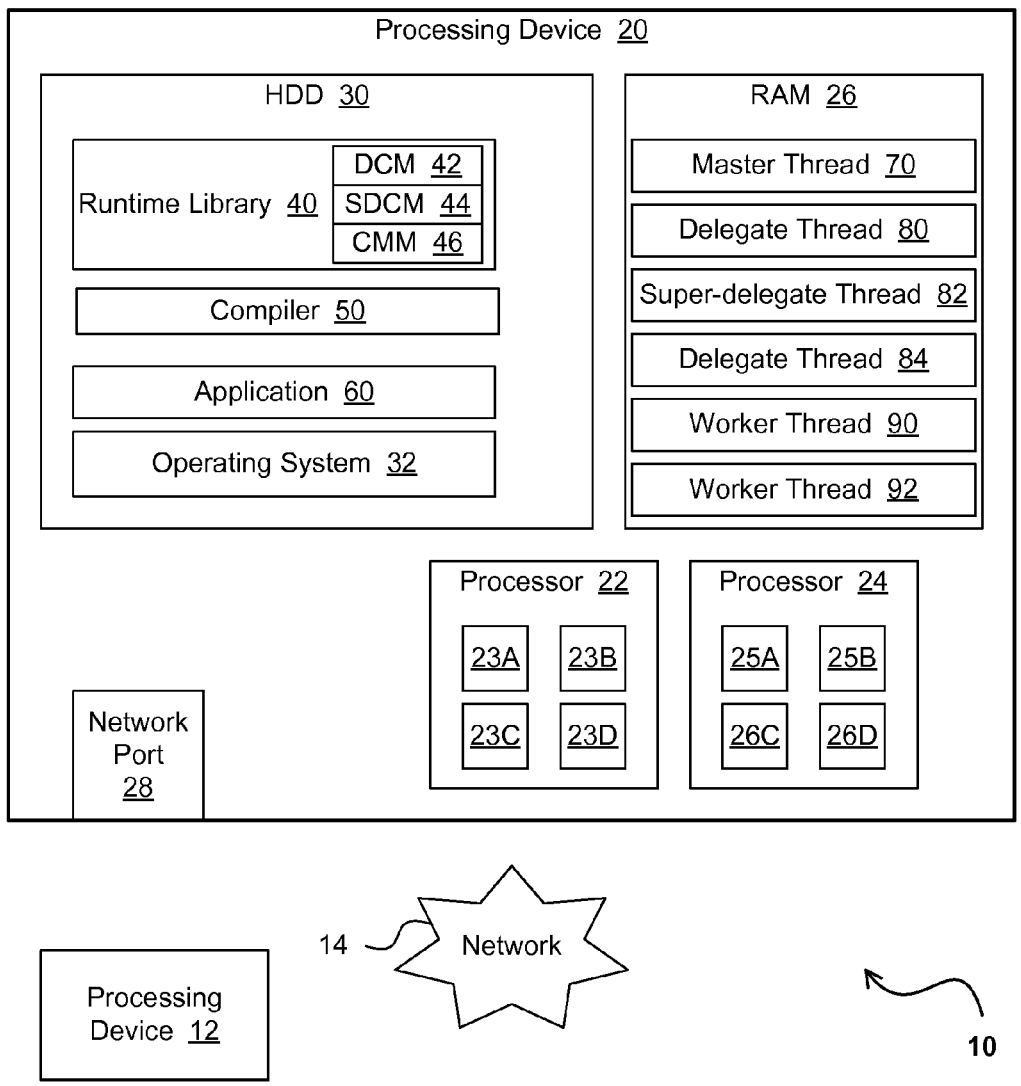
FIG. 1 is a block diagram of an example data processing system with features for controlling affinity settings for execution entities.

Threads and processes may be referred to as execution entities. For brevity and ease of understanding, this disclosure focuses primarily on threads. However, some or all of these teachings apply to processes, as well. Accordingly, unless the context clearly requires otherwise, references to threads should be understood as applying to all suitable types of execution entities, including processes.

An existing thread may cause a new thread to be created. For purposes of this disclosure, that existing thread may be referred to as the master thread, the parent, or the caller; and the new thread may be referred to as the worker thread or the child. Also, for purposes of this disclosure, the following terms have the following meanings: Threads may also be referred to as software threads or threads of execution. The term hardware thread refers to the features of a processor that allow the processor to treat a single core as if it is more than one core. For instance, features described under the name/trademark INTEL HYPER-THREADING (HT) TECHNOLOGY provide for more than one hardware thread on one processing core. Since a hardware thread may look like a core to a software thread, a hardware thread may also be referred to as a core. And unless the context clearly requires otherwise, the term thread denotes a software thread (or another type of execution entity, such as a process), not a hardware thread. The term processor affinity refers to the capability of an execution entity to be consistently and exclusively executed by a prescribed set cores, as prescribed by the user. Memory affinity refers to the capability of an execution entity to maintain invariable and advantageous association with the closest possible parts of the memory hierarchy (e.g., caches, memory banks, non-uniform memory access (NUMA) domains) across its lifespan. I/O affinity refers to the capability of an execution entity to maintain invariable and advantageous association with the selected I/O devices (e.g., storage, network, and other peripheral devices). Execution entity affinity refers to the processor, memory, and I/O affinity settings of the execution entity involved. For instance, thread affinity refers to the processor, memory, and I/O affinity settings of the thread involved, and process affinity refers to a set of the thread affinity settings for the constituent threads of a process. Residency is used to indicate which resources have actually been allocated to an execution entity. For instance, processor residency of a thread refers to the processing core and/or hardware thread in which the content of the thread is being executed. Similarly, memory residency and I/O residency refer to the memory and I/O resources, respectively, that have been allocated to an execution entity.

Thus, a thread may have affinity settings which specify a set of cores (e.g., cores 0 and 1) as acceptable for executing the thread. And consequently, when the OS dispatches the thread to execute, the OS will dispatch the thread to one of the cores specified by the affinity settings (e.g., either to core 0 or to core 1). Thus, a thread may have affinity for cores 0 and 1, and the thread may reside on core 0, for instance. As indicated above, the settings which specify acceptable resources for an execution entity may be referred to as affinity settings or as an affinity mask. By contrast, the data that identifies which resources have been actually allocated to an execution entity may be referred to as residency attributes.

Typically, as indicated above, when a parent thread creates a child thread, the child thread inherits the processor, memory, and I/O affinity settings of the parent thread. For example, when a thread with affinity for cores 0 and 1 spawns a child thread, the child thread will inherit the affinity for cores 0 and 1. However, different affinity settings might be more appropriate for the child thread. For instance, the thread might be able to perform better on core 2. Suboptimal affinity settings of all three kinds (processor, memory, and I/O) are known to result in suboptimal application performance, sometimes ranging in the orders of magnitude below the optimum for the given hardware. It is therefore important to avoid suboptimal affinity settings.

An operating system (OS) may enable a thread to change its processor affinity setting. However, memory and I/O affinity settings may be more difficult to change. For example, it the thread is not created on a core that is associated with the desired memory resources, the OS may not allow the thread to subsequently change the memory affinity or residency. Therefore, it may be important for the parent thread to have the right processor and memory affinity settings prior to the act of creating the child thread. In some situations, this may also hold for I/O affinity settings. Additionally, however, it may be equally important to retain the optimal affinity settings of the parent thread, especially, when that thread will be shouldering the main computational load for an application and will thus be performance critical for the whole application.

One approach to handling this challenge is to (a) create a child thread with the same affinity settings as the parent, and then (b) try to change the affinity settings of the child to the desired affinity settings. This approach apparently preserves the parent's affinity settings. However, if the desired affinity settings for the child are not a subset of the affinity settings for the parent, the processing device may not allow the child to adopt the desired affinity settings. Also, this approach may not work when the program executed by the worker thread is not controlled by the application. For example, the worker thread may not be controlled by the application when the application creates the worker thread by using a runtime library that implements the message passing system known as Message Passing Interface (MPI). For instance, the MPI library may create a worker thread with program code supplied by a third party, and that program code may not reliably set proper or desirable affinity settings.

Another approach to handling this challenge is (a) to change the affinity settings of the parent thread to settings which would be appropriate for the child thread before creating the child thread, and then (b) to change the affinity settings of the parent thread back to the original settings after creating the child thread. For instance, an application may query the current affinity settings of the parent and store those settings in a safe place. The application may then set the affinity of the parent to the desired affinity of the intended child. The parent may then create the child, which inherits the affinity settings of the parent, including the processor and memory affinity settings. The parent may then restore its affinity settings to the original ones, based on the affinity settings saved earlier. However, the attempt to restore the affinity settings of the parent may come after the parent has been swapped out by the OS. The likelihood of the parent getting swapped out is significant because thread creation is normally a relatively expensive process that takes significant wall clock time. If the parent has been swapped out, it may have lost the close association between the memory, the I/O and the process locality that the parent previously had. If that happens, the parent may be restored to the main memory in a configuration that will be unable to achieve the best possible performance, or even performance that was characteristic of the situation prior to the swap-out of the parent. Thus, the parent entity is exposed to detrimental effects between the time it changes its original settings to new settings and the time it changes the affinity settings back to original. In addition, if the desired affinity settings for the child are not a subset of the original affinity settings for the parent, the processing device may not allow the parent to adopt the desired affinity settings.

For at least the foregoing reasons, it would be advantageous, when creating a child thread, to preserve the affinity settings of the parent across the moment of creation.

The present disclosure describes techniques for controlling affinity that enable a parent execution entity to create a child execution entity with different affinity settings from the parent, without changing the affinity settings or the processor residency of the parent. In other words, a parent execution entity can create a child execution entity that has different affinity settings from the parent, while preserving the affinity settings as well as processor residency of the parent. As described in greater detail below, such techniques may provide for thread affinity control through delegation of the thread creation, with preservation of the parent affinity settings. For instance, the parent execution entity may delegate the act of creation to another entity (or entities) that are free to assume any affinity settings necessary. At the same time, thanks to the delegation, the parent execution entity may be guaranteed to preserve its affinity settings unchanged and unchallenged.

FIG. 1 is a block diagram of an example data processing system 10 with features for controlling affinity settings for execution entities. As used herein, the terms processing system and data processing system are intended to broadly encompass a single machine or a system of communicatively coupled machines or devices operating together. For instance, two or more machines may cooperate using one or more variations on a peer-to-peer model, a client/server model, or a cloud computing model to provide some or all of the functionality described herein.

In the embodiment of FIG. 1, data processing system 10 includes a local processing device 20 and a remote processing device 12. Any suitable types of processing devices may be used for local processing device 20 and remote processing device 12. In some embodiments, the remote processing device may be omitted. In the embodiment of FIG. 1, the processing devices in processing system 10 connect to or communicate with each other via one or more networks 14. The networks may include local area networks (LANs) and/or wide area networks (WANs) (e.g., the Internet). For purposes of this disclosure, local processing device 20 may also be referred to simply as "processing device 20."

In the embodiment of FIG. 1, processing device 20 features two central processing units (CPUs) or processors 22 and 24, along with random access memory (RAM) 26, a network port 28, and one or more nonvolatile mass data storage devices such as a hard disk drive (HDD) 30. RAM 26, network port 28, and HDD 30 may be responsive to or coupled to processor 22. Additional input/output (I/O) components (e.g., a keyboard, a display, additional network ports, etc.) may also be responsive to or coupled to processor 22. The components of processing device 20 may be coupled via one or more intermediary components, such as a memory controller, an I/O controller, etc. Processing device 20 may be configured to partition certain resources into multiple channels. For instance, processing device 20 may treat RAM 26 as four distinct subsets of memory or memory channels (e.g., memory channels 0-3), and processing device 20 may group some I/O resources into a first I/O channel (e.g., I/O channel 0) and others into a second I/O channel (e.g., I/O channel 1). Also, processors 22 and 24 may each include multiple processor cores, such as cores 23A-23D in processor 22 and cores 25A-25D in processor 24. A processor core may also be referred to as a processing unit or a processing element.

In the embodiment of FIG. 1, HDD 30 contains an OS 32, a runtime library 40, a compiler 50, and an application 60. Compiler 50 may also be referred to as an application, and application 60 may also be referred to as a user application. Application 60 may also be referred to as application code. Processing device 20 may copy OS 32, runtime library 40, compiler 50, and application 60 into RAM 26 for execution. In one scenario, compiler 50 executes on top of OS 32, and compiler 50 is used to compile source code for application 60 into executable code for application 60.

In one embodiment, a processing device may use an OS distributed under the name or trademark LINUX. Other types of operating systems may be used in other embodiments. OS 32 may provide some thread management services. For instance, OS 32 may implement some or all of an interface specification known under the name or trademark POR-
TABLE OPERATING SYSTEM INTERFACE (POSIX),
and in particular, OS 32 may support the POSIX threads
(pthreads) interface.

In the embodiment of FIG. 1, runtime library 40 implements an Open Multi-Processing (OpenMP) application programming interface (API) specification. Accordingly, runtime library 40 may provide OpenMP directives which serve as a language extension for programming languages such as C, C++ and Fortran. In another embodiment, the runtime library implements the MPI message passing system. In another embodiment, the library distributed under the name/trademark INTEL THREAD BUILDING BLOCKS (TBB) is used for the runtime library. Other types of runtime libraries may be used in other embodiments.

The present teachings may be incorporated into any one or more of OS 32, runtime library 40, compiler 50, and application 60, as well as any other runtime library or application that deals with creating threads. For example, in the embodiment of FIG. 1, runtime library 40 includes a delegate creation module (DCM) 42, a super-delegate calling module (SDCM) 44, and a creation management module (CMM) 46. As described in greater detail below, CMM 46 uses DCM 42 and SDCM 44 to provide thread management features which enable a parent thread to create a child thread with different affinity settings from the parent, without changing the affinity settings or the processor residency of the parent. CMM 46 may provide such features for the benefit of application 60. In other words, application 60 may use CMM 46, DCM 42 and SDCM 44 to automatically manage affinity for new threads. CMM 46 may also provide such features for the benefit of compiler 50 and/or OS 32. For example, compiler 50 may use features for managing thread affinity from runtime library 40 to manage the affinity of the threads used by compiler 50. Furthermore, in other embodiments, components like CMM 46, DCM 42 and/or SDCM 44 may reside in other places. For instance, a CMM, a DCM, and/or an SDCM may reside within the OS or within the executing application. For example, an application designed for high-performance computing may use its own CMM, DCM and/or SDCM to control affinity for threads spawned by that application (e.g., using the pthreads interface). CMMs, DCMs, and SDCMs may be implemented as functions, methods, or any other suitable type of program.

In the example embodiment, compiler 50 enables application 60 to use features for managing thread affinity from runtime library 40. For instance, application 60 may include OpenMP pragmas, and when compiler 50 compiles the source code for application 60 into executable code, compiler 50 may configure application 60 to be linked with runtime library 40. As indicated above, runtime library 40 may operate as an OpenMP library. For instance, runtime library 40 may provide features like the performance library known as libiomp5.so. Compiler 50 may configure application 60 to be dynamically or statically linked into runtime library 40. Consequently, when application 60 executes, runtime library 40 may automatically provide low-level mechanisms for creating threads and for managing thread affinity, as described in greater detail below.

As another example, an application may include MPI library function calls. In this instance, a runtime library may provide features like those provided by the performance library known as libmpi.so, and the processes of the application may be created using programs such as mpirun or mpiexec.

In the embodiment of FIG. 1, the physical layout of CPUs, memory and I/O channels relative to each other is predefined and cannot be changed in the application context. For instance, the layout may be fixed when processing device 20 is manufactured or at boot time prior to OS boot. For instance, certain I/O configuration settings may be set during the pre-OS boot process. After boot, processing device 20 may use the first-touch policy for memory allocation, so that an execution entity gets allocated physical memory closest to the processor (or core) from which that memory was first written (or touched). Also, processing device 20 may allocate I/O resources based on physical proximity between processors (or cores) and I/O components. In addition or alternatively, processing device 20 may make other techniques for allocating memory and I/O resources available to applications. For instance, OS 32 may include the libnuma library, which provides special APIs for specifying memory allocation policies. Whichever techniques are used, memory and I/O resources will typically, at least in effect, be allocated to respective processors (or cores). And as indicated above, resource allocation for an execution entity is typically controlled by the affinity settings for that execution entity. For instance, processor allocation may be controlled by processor affinity settings. And since memory and I/O resources are allocated to processors (or cores), once the processor residency for a thread is set, that residency immediately establishes corresponding memory and I/O affinities for the thread. Consequently, memory affinity and I/O affinity may be controlled by processor affinity.

Processing device 20 may use any suitable techniques to keep track of and implement affinity settings and residency attributes. For example, OS 32 may use any suitable data structures, registers, and/or other storage mechanisms to keep track of the affinity settings and residency attributes for all execution entities. And when an execution entity is scheduled, OS 32 (and/or other components) may load the appropriate data into the responsible hardware resources (e.g., registers) in the responsible processing units or cores to actually affect the desired allocation of resources.

In one embodiment, compiler 50, application 60, or any other suitable software executing from RAM 26 includes at least a master thread 70. As depicted in FIG. 1, at least some parts of master thread 70 reside in RAM, although other parts may reside in other locations, such as in one or more registers in processor 22 or processor 24. As described in greater detail below, master thread 70 may then use a delegate thread 80, a super-delegate thread 82, and a delegate thread 84 to create worker threads, such as worker thread 90 and worker thread 92.

Figure 2:
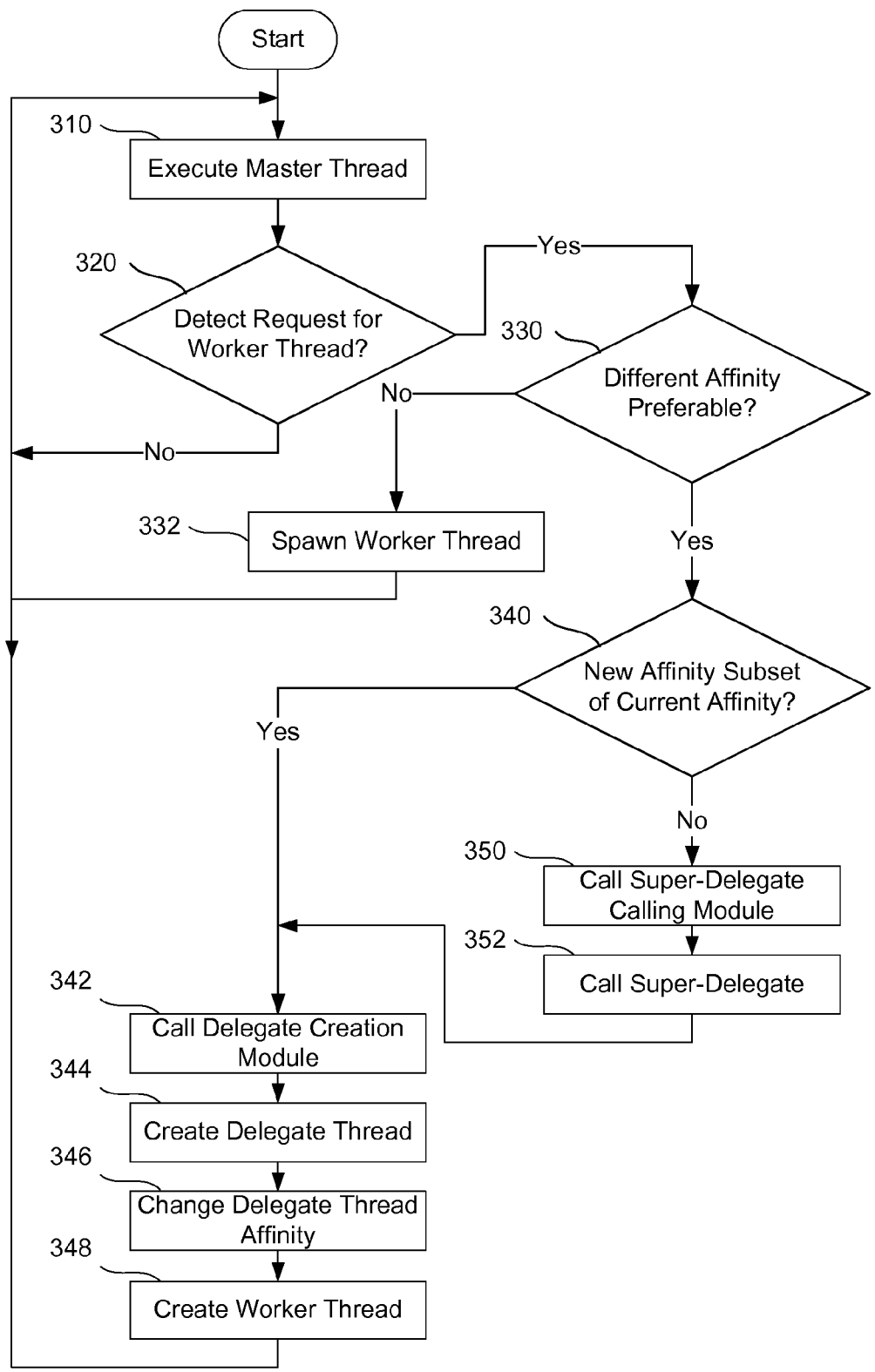
FIG. 2 is a flowchart of an example process for creating execution entities with desired affinities.

FIG. 2 is a flowchart of an example process for creating execution entities with desired affinities. The illustrated processor starts at block 310 with master thread 70 for application 60 executing in processing device 20. Further details for master thread 70 are illustrated in FIGS. 3, 4A, and 4B.

Figure 3:
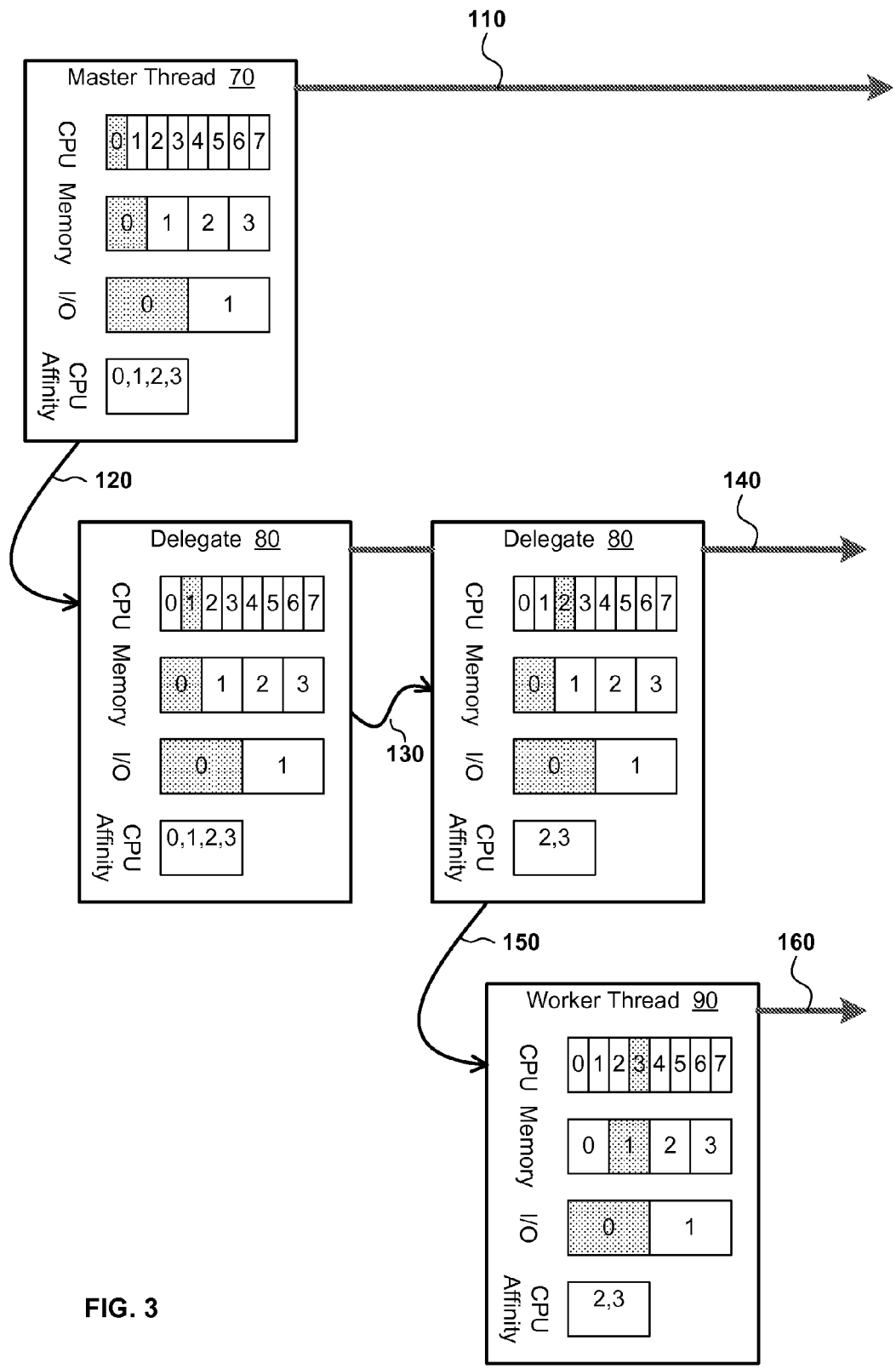
FIG. 3 is a block diagram illustrating an example process for creating an execution entity with desired affinities.
Figure 4A:
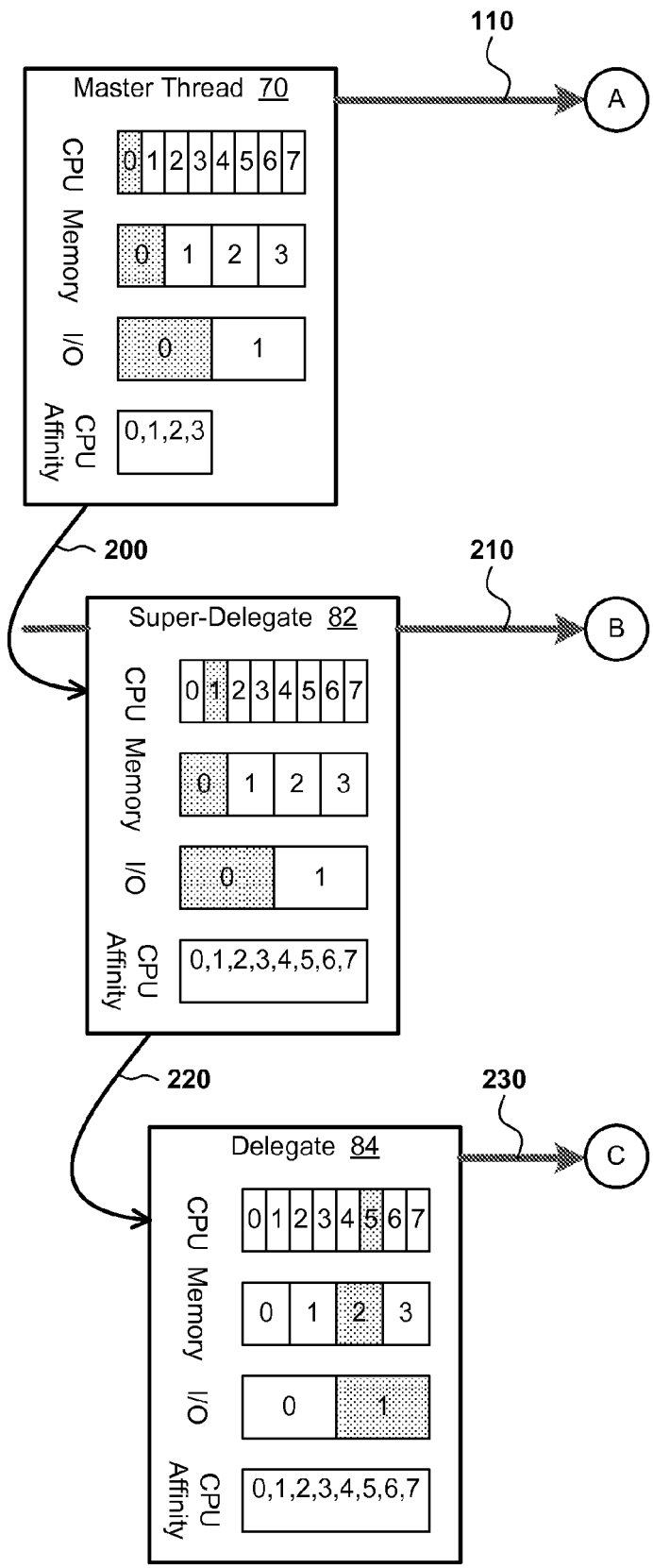
FIGS. 4A and 4B are block diagrams illustrating another example process for creating an execution entity with desired affinities.
Figure 4B:
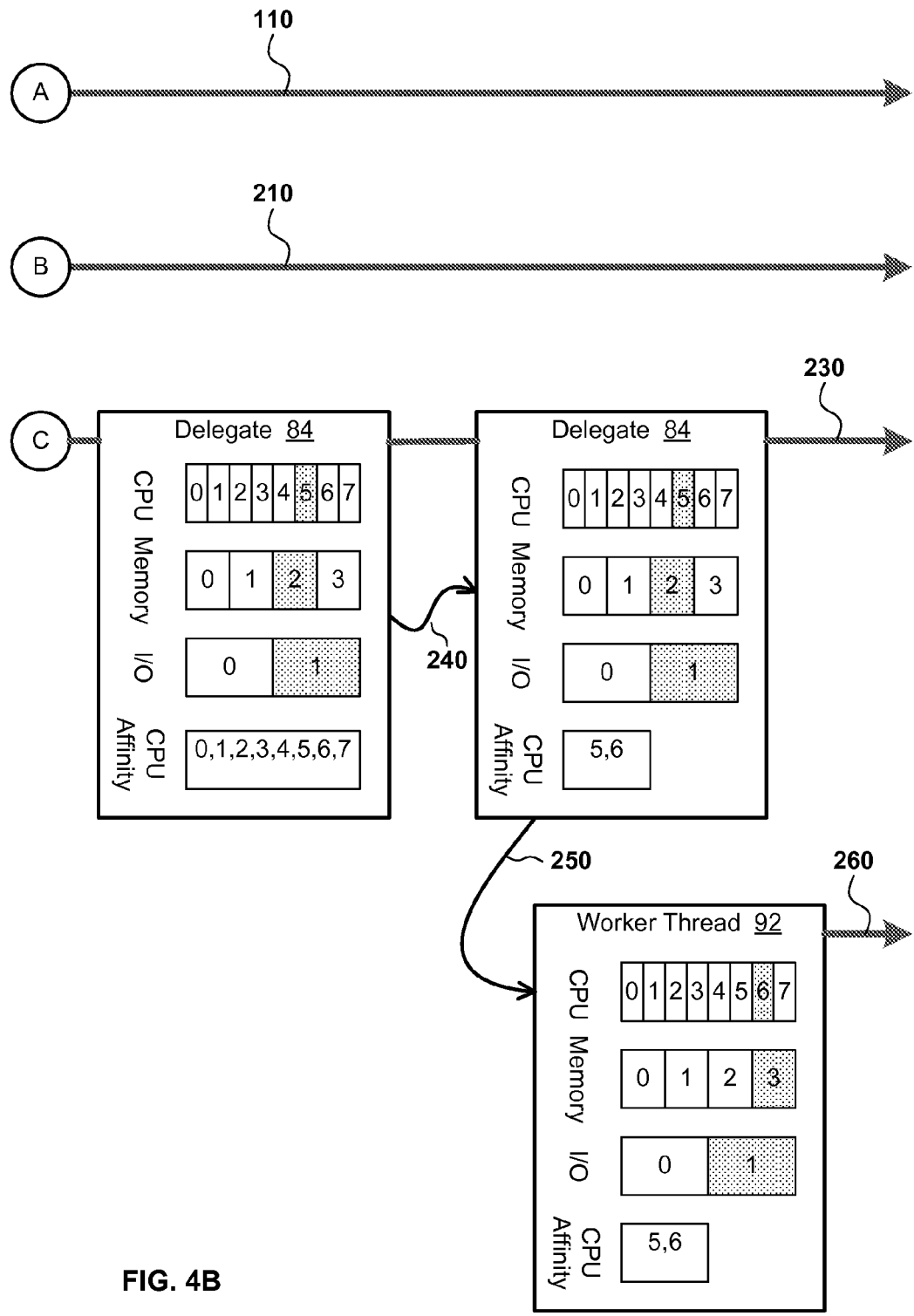

FIG. 3 is a block diagram illustrating an example process for creating an execution entity with desired affinities. The process illustrated in FIG. 3 corresponds to at least part of the process illustrated in FIG. 2, beginning with master thread 70 executing in processing device 20, as indicated above. In FIGS. 3, 4A, and 4B, the different resources within processing device 20 are depicted as rectangles within each thread. For instance, next to the heading "CPU," the eight rectangles labeled 0-7 correspond to the eight processing cores shown in FIG. 1. Next to the heading "Memory," the four rectangles labeled 0-3 depict four separate memory channels, with each memory channel occupying a different portion of RAM 26. And next to the heading "I/O," the two rectangles labeled 0-1 depict two separate I/O channels, with each I/O channel providing access to different I/O components. In addition, dotted fill is used to show which resources have actually been allocated to a thread (in other words, to show which resources a thread is resident on). For instance, the dotted fill in FIG. 3 denotes that master thread 70 is resident on core 0, memory channel 0, and I/O channel 0. In addition, the processor or core affinity settings for each thread are shown in a rectangle next to the heading "CPU Affinity." As illustrated, the affinity settings for master thread 70 specify cores 0 through 3 as acceptable cores for executing master thread 70.

Referring again to FIG. 2, block 320 shows CMM 46 in runtime library 40 determining whether application 60 is requesting creation of a worker thread. For instance, CMM 46 may determine that application 60 is requesting creation of a worker thread in response to the application needs, which may be expressed, for instance, via a compiler directive resulting in an OpenMP runtime library call or a process spawn request initiated by MPI master thread 70. If application 60 is not trying to create a worker thread, the process may return to block 310, and master thread 70 of application 60 may continue to execute. However, if application 60 is trying to create a worker thread, the process may pass to block 330, which shows CMM 46 determining whether it would be preferable for the worker thread to have a different affinity then master thread 70. For instance, CMM 46 may determine that a different affinity would be preferable if the intended workload requires a certain reconfiguration or rebalancing of the computational resources and their relationship with the memory and the other system components involved. Alternatively, master thread 70 may pass parameters to CMM 46 specifying affinity settings for the worker thread.

As indicated at block 332, if CMM 46 determines that a different affinity is not preferable, CMM 46 may spawn a worker thread for master thread 70 using more or less conventional techniques, and the worker thread may inherit the affinity settings of master thread 70. For instance, CMM 46 may use mechanisms from OS 32 to spawn or clone a worker thread for master thread 70.

However, if a different affinity is preferable, CMM 46 may then determine whether the preferred new affinity settings are a subset of the affinity settings for master thread 70, as shown at block 340. If the preferred or desired new affinity settings are a subset of the affinity settings for master thread 70, CMM 46 may then call DCM 42, as shown at block 342. When calling DCM 42, CMM 46 may provide parameters identifying the desired affinity settings for the worker thread.

As shown at block 344, DCM 42 may then spawn or clone a delegate thread, based on the parameters received from CMM 46. As described in greater detail below, the program that the delegate thread will execute includes control logic for altering the affinity of the delegate thread and for spawning a worker thread. That control logic may be referred to as the delegate thread program. In one embodiment, DCM 42 generates the delegate thread program by including statements that invoke existing OS and threading run-time routines (e.g., pthread_create, fork, execv, etc.) with the affinity settings prescribed by CMM 46. In particular, DCM 42 configures those statements according to the target required affinity settings for worker thread specified by CMM 46, resulting in a delegate thread program which, when executed, changes the affinity settings of the current thread and then creates a worker thread (which inherits the affinity settings of the current thread).

Referring also to FIG. 3, arrow 120 depicts DCM 42 creating a delegate thread 80 for master thread 70, as described above. As indicated above, FIG. 3 illustrates that the affinity settings for master thread 70 specify cores 0, 1, 2, 3 as acceptable cores for executing master thread 70. In other words, master thread 70 has processor affinity settings of 0, 1, 2, 3. For purposes of illustration, FIG. 3 illustrates a scenario where master thread 70 has a processor affinity of 0, 1, 2, 3, but CMM 46 has determined (and has notified DCM 42) that master thread 70 should instantiate a worker thread with a processor affinity of 2,3. FIG. 3 also illustrates that when delegate thread 80 is created, it inherits the affinity settings from master thread 70. However, delegate thread 80 may not reside on exactly the same resources as master thread 70. For instance, OS 32 could dispatch delegate thread 80 to core 1, as shown by the dotted fill in FIG. 3, consistently with the affinity settings.

Also, as indicated by arrow 110, after master thread 70 calls CMM 46, master thread 70 may continue executing instructions in parallel with delegate thread 80. In the embodiment of FIG. 3, master thread 70 continues executing as soon as DCM 42 notifies master thread 70 that delegate thread 80 has been created. In other embodiments, the master thread may wait until the delegate thread has changed its affinity settings, or until the delegate thread has spawned the worker thread.

As shown at block 346 of FIG. 2, once delegate thread 80 has been created, delegate thread 80 may change its own affinity settings to match those ultimately desired for the worker thread, based on control logic and/or parameters supplied by CMM 46. For instance, as illustrated by arrow 130 in FIG. 3, delegate thread 80 may change its processor affinity from 0, 1, 2, 3 to 2, 3. Delegate thread 80 may also change its processor residency accordingly. For instance, delegate thread 80 may move from core 1 to core 2. However, in one embodiment, some or all of the other resource residencies may remain unchanged. For instance, consistently with the first touch policy, even though delegate thread 80 (including its execution context) has moved to core 2, delegate thread 80 may continue to use memory channel 0 and I/O channel 0.

As shown at block 348 of FIG. 2, delegate thread 80 may then spawn or clone a worker thread 90 for master thread 70. When created, worker thread 90 will inherit the affinity mask from delegate thread 80 at the time of creation, which is core 2 and core 3 in the example embodiment. Thus, OS 32 will schedule worker thread 90 for execution to one of those cores. The dotted fill in FIG. 3 shows worker thread 90 being scheduled on core 3. Thus, after creation, worker thread 90 will touch its first memory at memory channel 1, and according to the first touch policy, worker thread 90 may thereafter reside on memory channel 1 and I/O channel 0. As illustrated by arrow 160, worker thread 90 may then execute the workload assigned to worker thread 90 by master thread 70. Delegate thread 80 may then enter a waiting or sleeping state, waiting for worker thread 90 to complete its work, as illustrated by arrow 140. When worker thread 90 is finished, delegate thread 80 may perform cleanup operations. The process of FIG. 2 may then return to block 310, with master thread 70 continuing to execute, possibly creating addition worker threads.

Referring again to block 340, if CMM 46 determines that master thread 70 should instantiate a worker thread with affinity settings that are not a subset of the master thread 70 settings, CMM 46 may call SDCM 44, as shown at block 350. SDCM 44 may then call a pre-existing super-delegate thread, as shown at block 352. Arrow 200 in FIG. 4A also illustrates master thread 70 calling super-delegate thread 82. In particular, SDCM 44 calls a super-delegate thread that has affinity settings that are a superset of the settings desired for the worker thread.

For instance, FIGS. 4A and 4B depict a scenario in which master thread 70 has affinity settings for cores 0, 1, 2, and 3, but CMM 46 has determined that master thread 70 should instantiate a worker thread with affinity for cores 5 and 6. Also, in that scenario, super-delegate thread 82 has affinity settings for cores 0, 1, 2, 3, 4, 5, 6, and 7. Thus, the desired affinity for the worker thread is not a subset of the affinity settings for the master thread 70, but it is a subset of the affinity settings for super-delegate thread 82.

In another scenario, two or more super-delegate threads may be used, and each super-delegate thread may have affinity settings for at least some different resources. For instance, one super-delegate thread could have affinity for cores 0, 1, 2, and 3, and another super-delegate thread could have affinity for cores 4, 5, 6, and 7.

In the embodiment of FIGS. 2, 4A, and 4B, super-delegate thread 82 has been created in advance with proper affinity settings. For example, run-time library 40 may create super-delegate thread 82 (and/or other super-delegate threads) when application 60 starts, before master thread 70 needs to create the worker threads. Alternatively, OS 32 may create super-delegate thread 82 (and/or other super-delegate threads) at boot time, and OS 32 may provide super-delegate threads for use to run-time libraries via one or more special APIs. In one embodiment, if no super-delegate thread with suitable affinity settings exists when the CMM determines that the master thread should instantiate a worker thread with affinity settings that are not a subset of the settings for the master thread (e.g., as depicted at block 340 of FIG. 2), the CMM may dynamically create a suitable super-delegate thread dynamically when needed, and the CMM may then use an SDCM to call that super-delegate thread (e.g., as depicted at block 350 of FIG. 2).

The program that the super-delegate thread will execute includes control logic for calling DCM 42. That control logic may be referred to as the super-delegate thread program. That program may accept and utilize parameters for controlling processor, memory, and/or I/O affinity settings for the delegate threads to be instantiated. For instance, the super-delegate thread program may accept affinity parameters from CMM 46, and may forward some or all of those parameters to DCM 42. Thus, super-delegate thread 82 may use those parameters to control the actions of the delegate thread to be created by DCM 42, and thus the worker thread to be created by that delegate thread.

Referring again to FIG. 2, as shown by the arrow leading from block 352 to block 342, once super-delegate thread 82 has been called, it may then call DCM 42. As shown at block 344 (and by arrow 220 of FIG. 4A), DCM 42 may then clone or spawn a delegate thread 84, and delegate thread 84 may inherit the affinity settings of super-delegate thread 82. Also, as shown by arrow 210, super-delegate thread 82 may then continue to exist, possibly in a sleeping or waiting state, and super-delegate thread 82 may be called again later to create additional delegate threads and worker threads. The threads from FIG. 4A may then continue in FIG. 4B, as depicted by page connectors A-C.

DCM 42 may create delegate thread 84, based on the parameters received from CMM 46 via SDCM 44. Additional details on the features of the delegate thread program to run as delegate thread 84 are provided above, with regard to delegate thread 80.

As shown at block 346 of FIG. 2 (and by arrow 240 of FIG. 4B), after it is launched, delegate thread 84 may change its affinity to the affinity settings desired for the worker thread (e.g., with affinity for cores 5 and 6). As shown at block 348 of FIG. 2 (and by arrow 250 of FIG. 4B), delegate thread 84 may spawn or clone worker thread 92 with the desired affinity settings. As illustrated by arrow 260 in FIG. 4B, worker thread 92 may then execute the workload assigned to worker thread 92 by master thread 70. Also, as illustrated by arrow 230, delegate thread 84 may then enter a waiting or sleeping state, waiting for worker thread 92 to complete its work. When worker thread 92 is finished, delegate thread 84 may perform cleanup operations.

After worker thread 92 has been launched, the process of FIG. 2 may return to block 310, and master thread 70 of application 60 may continue to execute. Alternatively, master thread 70 may continue executing in response to CMM 46 calling SDCM 44. Alternatively, master thread 70 may continue executing in response to SDCM 44 calling super-delegate thread 82, in response to super-delegate thread 82 creating delegate thread 84, or in response to delegate thread 84 changing its affinity settings.

Proper affinity settings for multi-core and many-core processors contribute significantly to overall system performance, as does the controlled inheritance and management of affinity settings. An advantage of one embodiment is that the disclosed technology makes it possible for a master thread to spawn a worker thread with different affinity setting, without changing the affinity settings or residency of the master thread. Consequently, the present teachings may be used to develop better runtime libraries, for example.

In light of the principles and example embodiments described and illustrated herein, it will be recognized that the illustrated embodiments can be modified in arrangement and detail without departing from such principles. For instance, parts of the present disclosure refer to various features and techniques for controlling affinity for threads. However, those same kinds of features and techniques may be used with minor (if any) modifications to control affinity for other types of execution entities, such as processes.

Also, this disclosure refers to a CMM that determines whether a master thread is trying to create a worker thread and what the affinity settings for the worker thread should be. In some embodiments, the CMM may determine what the affinity settings for the worker thread should be based on the expected needs of the worker thread and the current utilization of processing resources. In addition or alternatively, a master thread may explicitly provide the CMM with parameters specifying the desired affinity settings for the worker thread, or the master thread may call a DCM and/or an SDCM directly, with parameters specifying the desired affinity settings for the worker thread.

Also, parts of the present disclosure refer to processor affinity settings, but in alternative embodiments, processing devices may enable applications to dynamically reconfigure memory and I/O resources at application run-time. Accordingly, references to processor affinity should also be understood as referring, where appropriate, to affinity settings for other resources, such as memory, I/O, and other consumable or limited resources in a computer system. For instance, in one embodiment, an application or a CMM specifies memory and/or I/O affinity in additional to processor affinity, and a DCM creates a delegate thread program which, when executed, creates a worker thread with those affinities. In another embodiment, an application or a CMM specifies a particular memory (or I/O) affinity, and a DCM selects a suitable processor affinity based on the specified memory (or I/O) affinity setting.

Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. In addition, the present teachings may be used to advantage in many different kinds of data processing systems. Examples of such data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, hand-held devices, entertainment devices such as audio devices, video devices, audio/video devices (e.g., televisions and set top boxes), vehicular processing systems, and other types of devices where preservation of the affinity settings for the parent execution entity is required or beneficial. Accordingly, unless explicitly specified otherwise or required by the context, references to any particular type of data processing system (e.g., a PC) should be understood as encompassing other types of data processing systems, as well.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term bus includes pathways that may be shared by more than two devices, as well as point-to-point pathways.

This disclosure may refer to instructions, statements, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term program may be used in general to cover a broad range of software constructs, including applications, routines, modules, drivers, subprograms, processes, functions, methods, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term ROM may be used in general to refer to non-volatile memory devices such as erasable programmable ROM (EPROM), electrically erasable programmable ROM (EEPROM), flash ROM, flash memory, etc. In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. In some embodiments, some or all of the control logic for implementing the described operations may be implemented in hardware logic (e.g., as part of an integrated circuit chip, a programmable gate array (PGA), an ASIC, etc.).

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with features for controlling affinity for execution entities. The data processing system comprises a delegate creation module and a processing element that is operable to execute a parent execution entity for an application. The parent execution entity has a first affinity setting. When executed, the delegate creation module enables the data processing system to create, for the parent execution entity, a worker execution entity that has a second affinity setting without changing the affinity setting of the parent execution entity. The second affinity setting differs from the first affinity setting.

Example A2 is a data processing system with the features of Example A1. In addition, the processing element comprises a first core, and the data processing system further comprises a second core. The operation of creating the delegate execution entity comprises executing the delegate execution entity on the first core. The operation of changing the affinity setting of the delegate execution entity to the second affinity setting causes the delegate execution entity to move from the first core to the second core. The parent execution entity and the worker execution entity enable the application to perform workload for the application on the first and second cores in parallel.

Example A3 is a data processing system with the features of Example A1. In addition, the delegate creation module enables the data processing system to perform operations comprising (a) creating a delegate execution entity that also has the first affinity setting; (b) after creating the delegate execution entity, changing the affinity setting of the delegate execution entity to the second affinity setting; and (c) after changing the affinity setting of the delegate execution entity to the second affinity setting, using the delegate execution entity to create the worker execution entity with the second affinity setting. Example A3 may also include the features of Example A2.

Example A4 is a data processing system with the features of Example A1. In addition, the delegate creation module is configured to create the delegate execution entity in response to a request from the parent execution entity for creation of the worker execution entity. Example A4 may also include the features of Examples A2 and A3.

Example A5 is a data processing system with the features of Example A1. In addition, the data processing system comprises a creation control module configured to perform operations comprising (a) automatically determining whether the worker execution entity should have the first affinity setting and (b) automatically using the delegate creation module to create the delegate execution entity and the worker execution entity in response to a determination that the worker execution entity should not have the first affinity setting. Example A5 may also include the features of Examples A2 through A4.

Example A6 is a data processing system with the features of Example A1. In addition, the data processing system comprises a super-delegate calling module that enables the data processing system to perform operations comprising (a) calling a super-delegate execution entity having a third affinity setting; (b) using the super-delegate execution entity to create a delegate execution entity that also has the third affinity setting; (c) after creating the delegate execution entity, changing the affinity setting of the delegate execution entity to the second affinity setting; and (d) after changing the affinity setting of the delegate execution entity to the second affinity setting, using the delegate execution entity to create the requested worker execution entity with the second affinity setting. Example A6 may also include the features of Examples A2 through A5.

Example A7 is a data processing system with the features of Example A6. In addition, the data processing system comprises a creation control module that enables the data processing system to perform operations comprising (a) automatically determining whether the second affinity setting is a subset of the first affinity setting and (b) automatically calling the super-delegate execution entity in response to a determination that the second affinity setting is not a subset of the first affinity setting. Example A7 may also include the features of Examples A2 through A5.

Example B1 is a method for controlling affinity for execution entities. The method pertains to a data processing system that is executing a parent execution entity of an application, wherein the parent execution entity has a first affinity setting. The method comprises the operation of enabling the data processing system to create, for the parent execution entity, a worker execution entity that has a second affinity setting without changing the affinity setting of the parent execution entity. The second affinity setting differs from the first affinity setting. The method also comprises performing workload for the application with the parent execution entity and the worker execution entity in parallel.

Example B2 is a method with the features of Example B1. In addition, the operation of enabling the data processing system to create a worker execution entity that has a second affinity setting comprises (a) creating a delegate execution entity that also has the first affinity setting; (b) after creating the delegate execution entity, changing the affinity setting of the delegate execution entity to the second affinity setting; and (c) after changing the affinity setting of the delegate execution entity to the second affinity setting, using the delegate execution entity to create the worker execution entity with the second affinity setting.

Example B3 is a method with the features of Example B2. In addition, the operation of creating the delegate execution entity is performed in response to a request from the parent execution entity for creation of the worker execution entity.

Example B4 is a method with the features of Example B2. In addition, the method comprises automatically determining whether the worker execution entity should have the first affinity setting. Also, the operation of changing the affinity setting of the delegate execution entity is performed in response to a determination that the worker execution entity should not have the first affinity setting. Example B4 may also include the features of Example B3.

Example B5 is a method with the features of Example B4. In addition, the operation of creating the delegate execution entity is performed in response to the determination that the worker execution entity should not have the first affinity setting. Example B5 may also include the features of Example B3.

Example B6 is a method with the features of Example B4. In addition, the operation of automatically determining whether the worker execution entity should have the first affinity setting is performed by the application. Example B6 may also include the features of Examples B3 and B5.

Example B7 is a method with the features of Example B4. In addition, the operation of automatically determining whether the worker execution entity should have the first affinity setting is performed by a module outside of the application. Example B7 may also include the features of Examples B3 and B5.

Example B8 is a method with the features of Example B1. In addition, the operation of enabling the data processing system to create a worker execution entity that has a second affinity setting comprises (a) calling a super-delegate execution entity that has a third affinity setting; (b) using the super-delegate execution entity to create a delegate execution entity that also has the third affinity setting; (c) after creating the delegate execution entity, changing the affinity setting of the delegate execution entity to the second affinity setting; and (d) after changing the affinity setting of the delegate execution entity to the second affinity setting, creating the requested worker execution entity with the second affinity setting. Example B8 may also include the features of Examples B2 through B7.

Example B9 is a method with the features of Example B8. In addition, the method comprises determining whether the second affinity setting is a subset of the first affinity setting. The operation of calling the super-delegate execution entity is performed in response to a determination that the second affinity setting is not a subset of the first affinity setting. Example B9 may also include the features of Examples B2 through B7.

Example B10 is a method with the features of Example B9. In addition, the second affinity setting is a subset of the third affinity setting. Example B10 may also include the features of Examples B2 through B7.

Example C is at least one non-transitory machine accessible medium comprising computer instructions for controlling affinity for execution entities. The computer instructions, in response to being executed on a data processing system, enable the data processing system to perform a method according to any of Examples B1 through B10.

Example D is a data processing system with features for controlling affinity for execution entities. The data processing system comprises a processing element and at least one machine accessible medium responsive to the processing element, The data processing system also comprises computer instructions stored at least partially in the at least one machine accessible medium, wherein the computer instructions, in response to being executed, enable the data processing system to perform a method according to any of Examples B1 through B10.

Example E is a data processing system with features for controlling affinity for execution entities. The data processing system comprises means for performing the method of any one or more of Examples B1 through B10.

Example F1 is an apparatus to enable control of affinity for execution entities. The apparatus comprises at least one non-transitory machine accessible medium and computer instructions in the machine accessible medium. The computer instructions, in response to being executed on a data processing system, enable a parent execution entity with a first affinity setting to create a worker execution entity with a second affinity setting without changing the affinity setting of the parent execution entity. The second affinity setting differs from the first affinity setting.

Example F2 is an apparatus with the features of Example F1. Also, the computer instructions enable the parent execution entity and the worker execution entity to perform workload for an application in parallel.

Example F3 is an apparatus with the features of Example F1. Also, the operation of creating a worker execution entity with a second affinity setting without changing the affinity setting of the parent execution entity comprises (a) creating a delegate execution entity that also has the first affinity setting; (b) after creating the delegate execution entity, changing the affinity setting of the delegate execution entity to the second affinity setting; and (c) after changing the affinity setting of the delegate execution entity to the second affinity setting, using the delegate execution entity to create the worker execution entity with the second affinity setting. Example F3 may also include the features of Example F2.

Example F4 is an apparatus with the features of Example F3. Also, the operation of creating the delegate execution entity is performed in response to a request from the parent execution entity for creation of the worker execution entity. Example F4 may also include the features of Example F2.

Example F5 is an apparatus with the features of Example F3. Also, the computer instructions enable the data processing system to automatically determine whether the worker execution entity should have the first affinity setting. Also, the operation of changing the affinity setting of the delegate execution entity is performed in response to a determination that the worker execution entity should not have the first affinity setting. Example F5 may also include the features of Examples F2 and F4.

Example F6 is an apparatus with the features of Example F5. Also, the operation of automatically determining whether the worker execution entity should have the first affinity setting is performed by the application. Example F6 may also include the features of Examples F2 and F4.

Example F7 is an apparatus with the features of Example F5. Also, the operation of automatically determining whether the worker execution entity should have the first affinity setting is performed by a module outside of the application. Example F7 may also include the features of Examples F2 and F4.

Example F8 is an apparatus with the features of Example F1. Also, the operation of creating a worker execution entity with a second affinity setting comprises (a) calling a super-delegate execution entity that has a third affinity setting; (b) using the super-delegate execution entity to create a delegate execution entity that also has the third affinity setting; (c) after creating the delegate execution entity, changing the affinity setting of the delegate execution entity to the second affinity setting; and (d) after changing the affinity setting of the delegate execution entity to the second affinity setting, creating the worker execution entity with the second affinity setting. Example F8 may also include the features of Examples F2 through F7.

Example F9 is an apparatus with the features of Example F8. Also, the computer instructions enable the data processing system to determine whether the second affinity setting is a subset of the first affinity setting. In addition, the operation of calling the super-delegate execution entity is performed in response to a determination that the second affinity setting is not a subset of the first affinity setting. Example F9 may also include the features of Examples F2 through F7.

Example F10 is an apparatus with the features of Example F9. Also, the second affinity setting is a subset of the third affinity setting. Example F10 may also include the features of Examples F2 through F7.

What is claimed is:

1. A data processing system with features for controlling affinity for execution entities, the data processing system comprising:
   a processing element that is operable to execute a parent execution entity for an application, the parent execution entity having a first affinity setting; and
   a delegate creation module which, when executed, enables the data processing system to create, for the parent execution entity, a worker execution entity that has a second affinity setting without changing the affinity setting of the parent execution entity, wherein the second affinity setting differs from the first affinity setting; and
   wherein the delegate creation module enables the data processing system to perform operations comprising:
   creating a delegate execution entity that also has the first affinity setting;
   after creating the delegate execution entity, changing the affinity setting of the delegate execution entity to the second affinity setting; and
   after changing the affinity setting of the delegate execution entity to the second affinity setting, using the delegate execution entity to create the worker execution entity with the second affinity setting.

2. A data processing system according to claim 1, wherein:
   the processing element comprises a first core;
   the data processing system further comprises a second core;
   the operation of creating the delegate execution entity comprises executing the delegate execution entity on the first core;

the operation of changing the affinity setting of the delegate execution entity to the second affinity setting causes the delegate execution entity to move from the first core to the second core; and the parent execution entity and the worker execution entity enable the application to perform workload for the application on the first and second cores in parallel.

3. A data processing system according to claim 1, wherein the delegate creation module is configured to create the delegate execution entity in response to a request from the parent execution entity for creation of the worker execution entity.

4. A data processing system according to claim 1, further comprising:
   a creation control module configured to perform operations comprising:
   automatically determining whether the worker execution entity should have the first affinity setting; and
   automatically using the delegate creation module to create the delegate execution entity and the worker execution entity in response to a determination that the worker execution entity should not have the first affinity setting.

5. A data processing system with features for controlling affinity for execution entities, the data processing system comprising:
   a processing element that is operable to execute a parent execution entity for an application, the parent execution entity having a first affinity setting;
   a delegate creation module which, when executed, enables the data processing system to create, for the parent execution entity, a worker execution entity that has a second affinity setting without changing the affinity setting of the parent execution entity, wherein the second affinity setting differs from the first affinity setting; and
   a super-delegate calling module that enables the data processing system to perform operations comprising:
   calling a super-delegate execution entity having a third affinity setting;
   using the super-delegate execution entity to create a delegate execution entity that also has the third affinity setting;
   after creating the delegate execution entity, changing the affinity setting of the delegate execution entity to the second affinity setting; and
   after changing the affinity setting of the delegate execution entity to the second affinity setting, using the delegate execution entity to create the worker execution entity with the second affinity setting.

6. A data processing system according to claim 5, further comprising:
   a creation control module that enables the data processing system to perform operations comprising:
   automatically determining whether the second affinity setting is a subset of the first affinity setting; and
   automatically calling the super-delegate execution entity in response to a determination that the second affinity setting is not a subset of the first affinity setting.

7. A method for controlling affinity for execution entities, the method comprising:
   in a data processing system that is executing a parent execution entity of an application, wherein the parent execution entity has a first affinity setting, enabling the data processing system to create, for the parent execution entity, a worker execution entity that has a second affinity setting without changing the affinity setting of the parent execution entity, wherein the second affinity setting differs from the first affinity setting; and
   performing workload for the application with the parent execution entity and the worker execution entity in parallel; and
   wherein the operation of enabling the data processing system to create a worker execution entity that has a second affinity setting comprises
   creating a delegate execution entity that also has the first affinity setting;
   after creating the delegate execution entity, changing the affinity setting of the delegate execution entity to the second affinity setting; and
   after changing the affinity setting of the delegate execution entity to the second affinity setting, using the delegate execution entity to create the worker execution entity with the second affinity setting.

8. A method according to claim 7, wherein the operation of creating the delegate execution entity is performed in response to a request from the parent execution entity for creation of the worker execution entity.

9. A method according to claim 7, further comprising:
   automatically determining whether the worker execution entity should have the first affinity setting; and
   wherein the operation of changing the affinity setting of the delegate execution entity is performed in response to a determination that the worker execution entity should not have the first affinity setting.

10. A method according to claim 9, wherein the operation of creating the delegate execution entity is also performed in response to the determination that the worker execution entity should not have the first affinity setting.

11. A method according to claim 9, wherein the operation of automatically determining whether the worker execution entity should have the first affinity setting is performed by the application.

12. A method according to claim 9, wherein the operation of automatically determining whether the worker execution entity should have the first affinity setting is performed by a module outside of the application.

13. A method for controlling affinity for execution entities, the method comprising:
   in a data processing system that is executing a parent execution entity of an application, wherein the parent execution entity has a first affinity setting, enabling the data processing system to create, for the parent execution entity, a worker execution entity that has a second affinity setting without changing the affinity setting of the parent execution entity, wherein the second affinity setting differs from the first affinity setting; and
   performing workload for the application with the parent execution entity and the worker execution entity in parallel; and
   wherein the operation of enabling the data processing system to create a worker execution entity that has a second affinity setting comprises:
   calling a super-delegate execution entity that has a third affinity setting;
   using the super-delegate execution entity to create a delegate execution entity that also has the third affinity setting;
   after creating the delegate execution entity, changing the affinity setting of the delegate execution entity to the second affinity setting; and after changing the affinity setting of the delegate execution entity to the second affinity setting, creating the worker execution entity with the second affinity setting.

14. A method according to claim 13, further comprising:
determining whether the second affinity setting is a subset of the first affinity setting; and
wherein the operation of calling the super-delegate execution entity is performed in response to a determination that the second affinity setting is not a subset of the first affinity setting.

15. A method according to claim 14, wherein the second affinity setting is a subset of the third affinity setting.

16. An apparatus to enable control of affinity for execution entities, the apparatus comprising:
at least one non-transitory machine accessible medium; and
computer instructions in the machine accessible medium, wherein the computer instructions, in response to being executed on a data processing system, enable a parent execution entity with a first affinity setting to create a worker execution entity with a second affinity setting without changing the affinity setting of the parent execution entity, wherein the second affinity setting differs from the first affinity setting; and
wherein the operation of creating a worker execution entity with a second affinity setting without changing the affinity setting of the parent execution entity comprises:
creating a delegate execution entity that also has the first affinity setting;
after creating the delegate execution entity, changing the affinity setting of the delegate execution entity to the second affinity setting; and
after changing the affinity setting of the delegate execution entity to the second affinity setting, using the delegate execution entity to create the worker execution entity with the second affinity setting.

17. An apparatus according to claim 16, wherein the computer instructions enable the parent execution entity and the worker execution entity to perform workload for an application in parallel.

18. An apparatus according to claim 16, wherein the operation of creating the delegate execution entity is performed in response to a request from the parent execution entity for creation of the worker execution entity.

19. An apparatus according to claim 16, wherein:
the computer instructions enable the data processing system to automatically determine whether the worker execution entity should have the first affinity setting; and
the operation of changing the affinity setting of the delegate execution entity is performed in response to a determination that the worker execution entity should not have the first affinity setting.

20. An apparatus according to claim 19, wherein the operation of automatically determining whether the worker execution entity should have the first affinity setting is performed by a module outside of the application.

21. An apparatus to enable control of affinity for execution entities, the apparatus comprising:
at least one non-transitory machine accessible medium; and
computer instructions in the machine accessible medium, wherein the computer instructions, in response to being executed on a data processing system, enable a parent execution entity with a first affinity setting to create a worker execution entity with a second affinity setting without changing the affinity setting of the parent execution entity, wherein the second affinity setting differs from the first affinity setting; and
wherein the operation of creating a worker execution entity with a second affinity setting comprises:
calling a super-delegate execution entity that has a third affinity setting;
using the super-delegate execution entity to create a delegate execution entity that also has the third affinity setting;
after creating the delegate execution entity, changing the affinity setting of the delegate execution entity to the second affinity setting; and
after changing the affinity setting of the delegate execution entity to the second affinity setting, creating the worker execution entity with the second affinity setting.

22. An apparatus according to claim 21, wherein:
the computer instructions enable the data processing system to determine whether the second affinity setting is a subset of the first affinity setting; and
the operation of calling the super-delegate execution entity is performed in response to a determination that the second affinity setting is not a subset of the first affinity setting.

* * * * *